(12) United States Patent
Edwards et al.

(10) Patent No.: US 8,035,516 B2
(45) Date of Patent: Oct. 11, 2011

(54) METHOD FOR INERTIAL ASSET PROTECTION ON VEHICLES AND FOR FALSE ALARM PREVENTION IN UNSTABLE LOCATIONS

(75) Inventors: Lewin Edwards, Forest Hills, NY (US); Christopher Beach, West Islip, NY (US)

(73) Assignee: Honeywell International Inc., Morristown, NJ (US)

( * ) Notice: Subject to any disclaimer, the term of this patent is extended or adjusted under 35 U.S.C. 154(b) by 426 days.

(21) Appl. No.: 12/234,083

(22) Filed: Sep. 19, 2008

(65) Prior Publication Data

US 2010/0073183 A1    Mar. 25, 2010

(51) Int. Cl.
*G08B 13/14* (2006.01)
(52) U.S. Cl. ............... 340/568.1; 340/571; 340/670
(58) Field of Classification Search ........... 340/568.1, 340/571, 566, 426.1, 431, 573.1, 506, 670, 340/669
See application file for complete search history.

(56) References Cited

U.S. PATENT DOCUMENTS

| 5,317,304 | A  | * | 5/1994  | Choi ........................ 340/571 |
| 7,432,823 | B2 | * | 10/2008 | Soni ...................... 340/870.02 |
| 2001/0030599 | A1 | * | 10/2001 | Zimmermann et al. ...... 340/426 |

* cited by examiner

*Primary Examiner* — Anh V La
(74) *Attorney, Agent, or Firm* — Husch Blackwell

(57) ABSTRACT

A system and method for false alarm prevention in unstable locations is presented. In one embodiment, the method comprises activating an asset sensor and a reference sensor, detecting motion in the asset sensor, determining if the reference sensor detects motion, and preventing transmission of an alarm if the reference sensor detects the motion. In another embodiment, the method comprises activating an asset sensor and a reference sensor, detecting motion in the asset sensor and transmitting acceleration data in accordance with the detected motion, sensing local acceleration data from the reference sensor, and signaling an alarm if a difference between the transmitted acceleration data and the local acceleration data is greater than a predetermined threshold. The reference sensor can be mounted in a control panel, and the asset and reference sensors can be enrolled in the control panel.

18 Claims, 4 Drawing Sheets

US 8,035,516 B2

METHOD FOR INERTIAL ASSET PROTECTION ON VEHICLES AND FOR FALSE ALARM PREVENTION IN UNSTABLE LOCATIONS

CROSS REFERENCE TO RELATED APPLICATION

This application is related to commonly-owned, co-pending U.S. patent application Ser. No. 11/603,387 filed on Nov. 22, 2006, the entire contents and disclosure of which is expressly incorporated by reference as if fully set forth herein.

FIELD OF THE INVENTION

This invention relates generally to protection of movable assets. In particular, this invention relates to a system and method for preventing false alarms for protected assets stored in unstable locations.

BACKGROUND OF THE INVENTION

A wireless asset sensor or alarm device can be attached to or mounted on some valuable object for its protection. The mounted sensor is generally small and unobtrusive so that its presence is not obvious. Such sensors or devices monitor the asset's movement, transmitting an alarm signal if the movement is greater than a pre-determined tolerance. Typically there are three possible conditions that cause an alarm to be triggered. A first is if the object is sensed to be in motion for more than about one second, a second is if the object is sensed to be in motion for more than about five seconds, and a third is if the object is tilted more than 30° off horizontal with reference to the Earth's gravitational field.

These asset sensors generally operate in conjunction with the control panel of a fixed or permanently installed security system in a static environment, such as a building. Each alarm condition can be associated with a loop on its associated security system control panel. Typically a control panel receives alarm signals from sensors, interprets each signal, and transmits alarm notifications in accordance with the signal. The notification may be a display on the control panel, an audible alarm, other visual notification such as flashing lights, or any combination thereof. A central office may be notified of the alarm in addition to, or instead of, local notification on the control panel.

However, there is a need for sensors with similar motion-detection functionality in non-static environments, in which the entire protected premise is subject to motion. Such premises can be boats, houseboats, RVs and other vehicles. For instance, a boat may have fishing gear or navigation electronics exposed on the deck, or removable outboard motors; it is desirable to protect these assets, and the asset sensor is an ideal choice. However, it cannot be used in these applications because the premises are not static. Instead, a moored boat, for example, will sway on the water's surface, and the swaying motion will cause false alarms. Furthermore, sensors as known in the art may cause false alarms in areas of high seismic activity, e.g. certain locations on the West Coast of the United States. Hence there is a clear need for an enhanced sensor capable of functioning even in these sorts of situations.

SUMMARY OF THE INVENTION

The present invention advantageously provides a novel system and method for false alarm prevention in unstable locations. In one embodiment, the method comprises activating an asset sensor and a reference sensor, detecting motion in the asset sensor, determining if the reference sensor detects motion, and preventing transmission of an alarm if the reference sensor detects the motion. The asset sensor and the reference sensor can each be enrolled in zones in a control panel. Motion can be detected by the asset sensor by recognizing a fault in a zone, and determining if a fault has occurred in the corresponding zone of the reference sensor. The system and method can include a timer or timing device to compensate for timing differences between the asset sensor and the reference sensor. The reference sensor is mounted on a known-stable location.

In another embodiment, the method comprises activating an asset sensor and a reference sensor, detecting motion in the asset sensor and transmitting acceleration data in accordance with the detected motion, sensing local acceleration data from the reference sensor, and signaling an alarm if a difference between the transmitted acceleration data and the local acceleration data is greater than a predetermined threshold. The reference sensor can be mounted in a control panel, and the asset and reference sensors can be enrolled in the control panel.

BRIEF DESCRIPTION OF THE DRAWING

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

The foregoing and other objects, aspects, features, and advantages of the invention will become more apparent from the following description and from the claims.

DISCLOSURE OF THE INVENTION

The present invention advantageously provides a system and method for enabling an asset sensor to distinguish between types of motion of its asset, thereby minimizing false alarms. In accordance with the inventive false alarm rejection or prevention function, motion produced from a moving vehicle, seismic activity, or swaying buildings can be identified and ignored while other motion or movement of the asset will trigger an alarm. The method compares the events, e.g. motions, experienced by an asset sensor the reference point will activate an alarm.

First Embodiment

Figure 1:
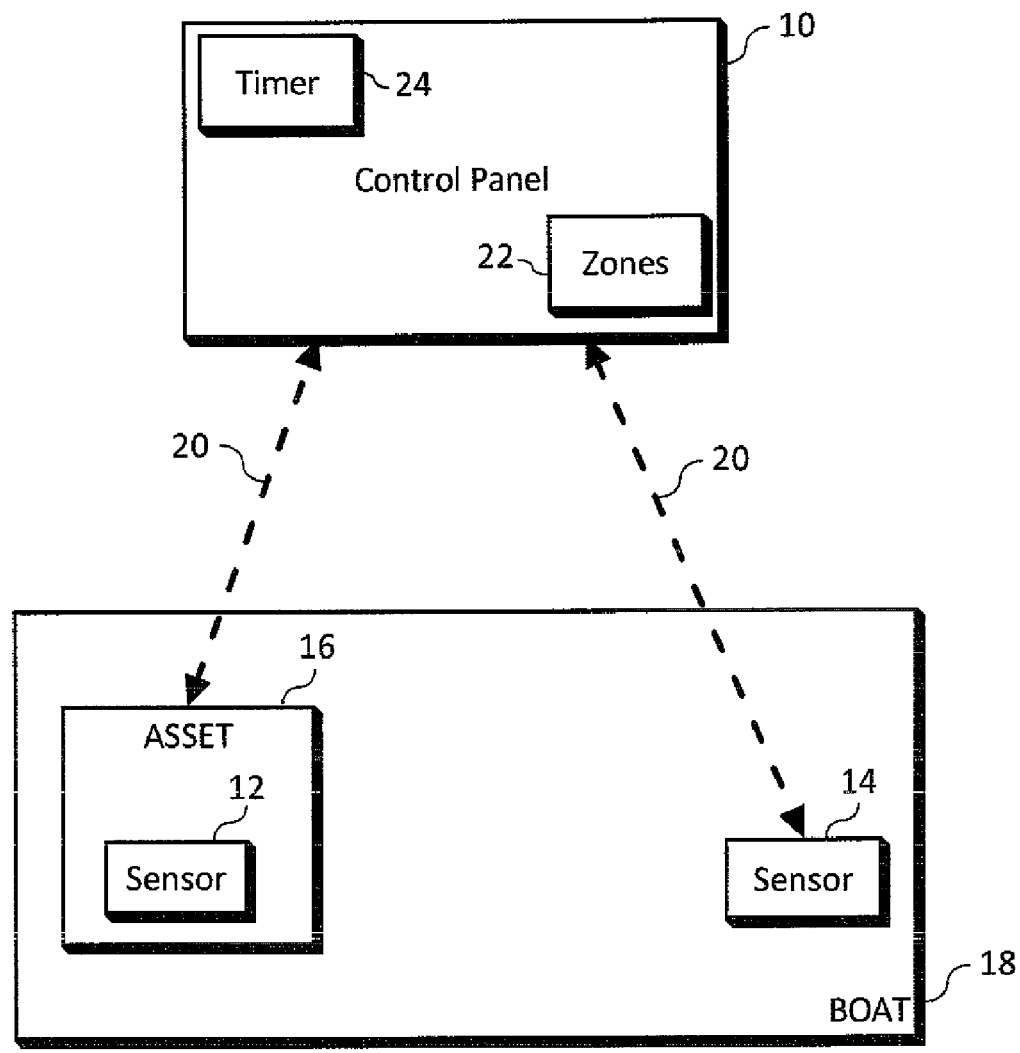
FIG. 1 is a schematic illustration of a first embodiment of the present invention.

In one embodiment as shown in FIG. 1, the inventive false alarm prevention function comprises a security control panel or panel 10 and at least two asset sensors 12, 14. One sensor 12 is mounted on an asset 16 to be protected. Each asset 16 desiring protection has its own sensor 12. While only one asset 16 and its sensor 12 are shown, a panel 10 can provide protection for more than one asset 16.

Another sensor 14 is fixed on a known-stable location 18. This reference sensor 14 can be attached, for example, to a wall or the hull of the boat 18. It is not necessary to have a separate reference sensor 14 for each asset sensor 12. The sensors 12, 14 are connected to the panel 10 using wireless communication capabilities 20 as are known in the art.

The panel 10 has zones or zone types 22. Each zone 22 corresponds to either a physical area, such as a bedroom, kitchen, etc., or an item or asset 16, such as a gun cabinet. In addition, detailed data can be associated with each zone 22. Such detailed data could provide instructions for actions when a gun cabinet zone, for example, is moved or otherwise violated. The establishment and maintenance of the zones 22 within the panel 10 of a security system is generally performed using software or computer programs. This maintenance can be performed remotely.

In one embodiment, the false alarm prevention function is achieved using only the security panel 10. A zone type having a type code specific to the asset sensors 12, 14 is defined within the panel 10. When a zone 22 is configured with this specific type code, then three particular zones 22 in the control panel 10 are reserved as "reference motion zones". In one embodiment, the zones 22 can be numbered as follows:
 a) Zone 97—Reference short motion (Loop 1)
 b) Zone 98—Reference long motion (Loop 2)
 c) Zone 99—Reference tilt (Loop 3)

The reference sensor 14, which is attached to a fixed location 18, can be enrolled in these three particular zones 22, that is, in the zones 22 above, Reference short motion, Loop 1, can be a two (2) second motion while reference long motion, Loop 2, can be a five (5) second motion. Reference tilt can be a tilting of thirty degrees off horizontal with reference to the Earth's gravitational field.

Figure 2:
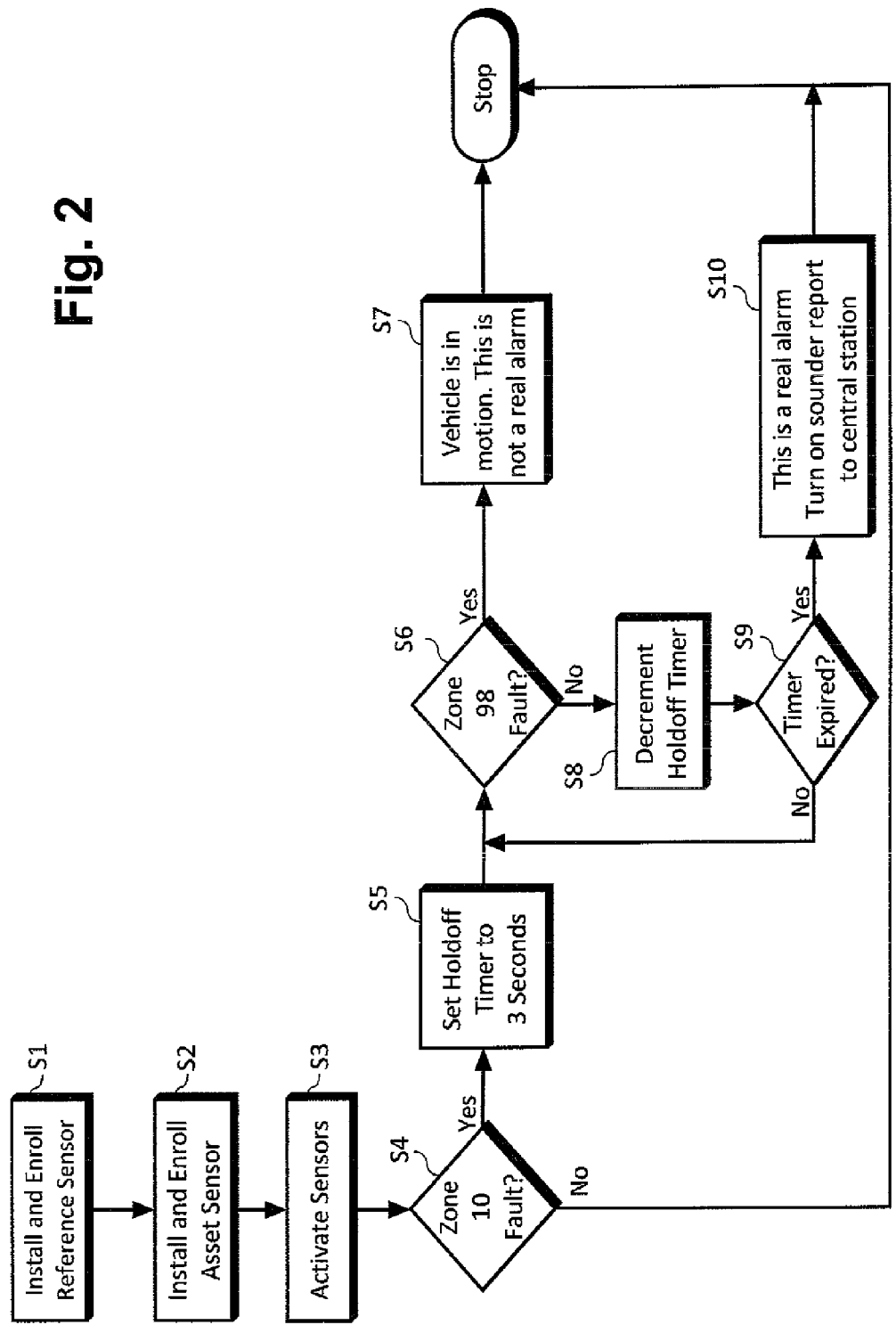
FIG. 2 is a flow diagram of the embodiment of FIG. 1.

Operation of this embodiment is shown in the flow diagram in FIG. 2. Initially, in step S1, a user installs the reference sensor 14 on a stable location of his boat 18 and enrolls or associates the sensor 14 with the panel 10 using zones 97, 98, and 99 as described above. In step S2, the user installs an asset sensor 12 on his asset of the boat's outboard motor 16, and enrolls Loop 2 (reference long motion) as an asset sensor zone, e.g. zone 10, in the control panel 10. Both sensors 12, 14 are activated in step S3. When long motion is detected by the asset sensor 12, e.g. zone 10 has a fault, (S4=Y), a holdoff timer 24 or "three-second catch window" is activated in step S5 by setting the timer 24 to three (3) seconds. This timer 24 compensates for timing differences between the two sensors 12, 14 and can be set to any appropriate value. If no motion is detected (S4=N), no activity occurs.

In step S6, the panel 10 checks for a fault state on zone 98, the zone associated with long motion in the reference sensor 14. If zone 98 is faulted (S6=Y), in step S7 the panel 10 assumes that the entire vehicle 18 is in motion; hence, no alarm should be sounded. On the other hand, if zone 98 is clear (S6=N), in step S8 the holdoff timer 24 is decremented. The timer 24 is checked in step S9 and if it is expired (S9=Y), then in step S10 the panel 10 assumes the motor 16 and sensor 12 is being moved relative to the boat, and an alarm condition exists. If the timer 24 is not expired (S9=N), processing resumes at step S6.

The association between the enrolled sensor zone, e.g. zone 10, and the corresponding reference zone, e.g. zone 98, is made on the basis of loop number. In the above example, Loop 2 is long motion on both the asset sensor 12 and the reference sensor 14. The same logic or flow diagram can be used for the short-motion and tilt loops. Hence, if Loop 1 is short motion on both the asset sensor 12 and the reference sensor 14, then an association is made between the enrolled sensor zone (not shown) and the corresponding reference zone, e.g. zone 97. The same applies to the tilt loop, e.g. Loop 3.

It can clearly be seen how this false alarm prevention function also prevents false alarms due to seismic activity; if the whole building is in motion, the reference sensor 14 will be in motion also. Implementation of this embodiment is straightforward and inexpensive, requiring only the addition of a reference sensor 14 to the security system.

Second Embodiment

Figure 3:
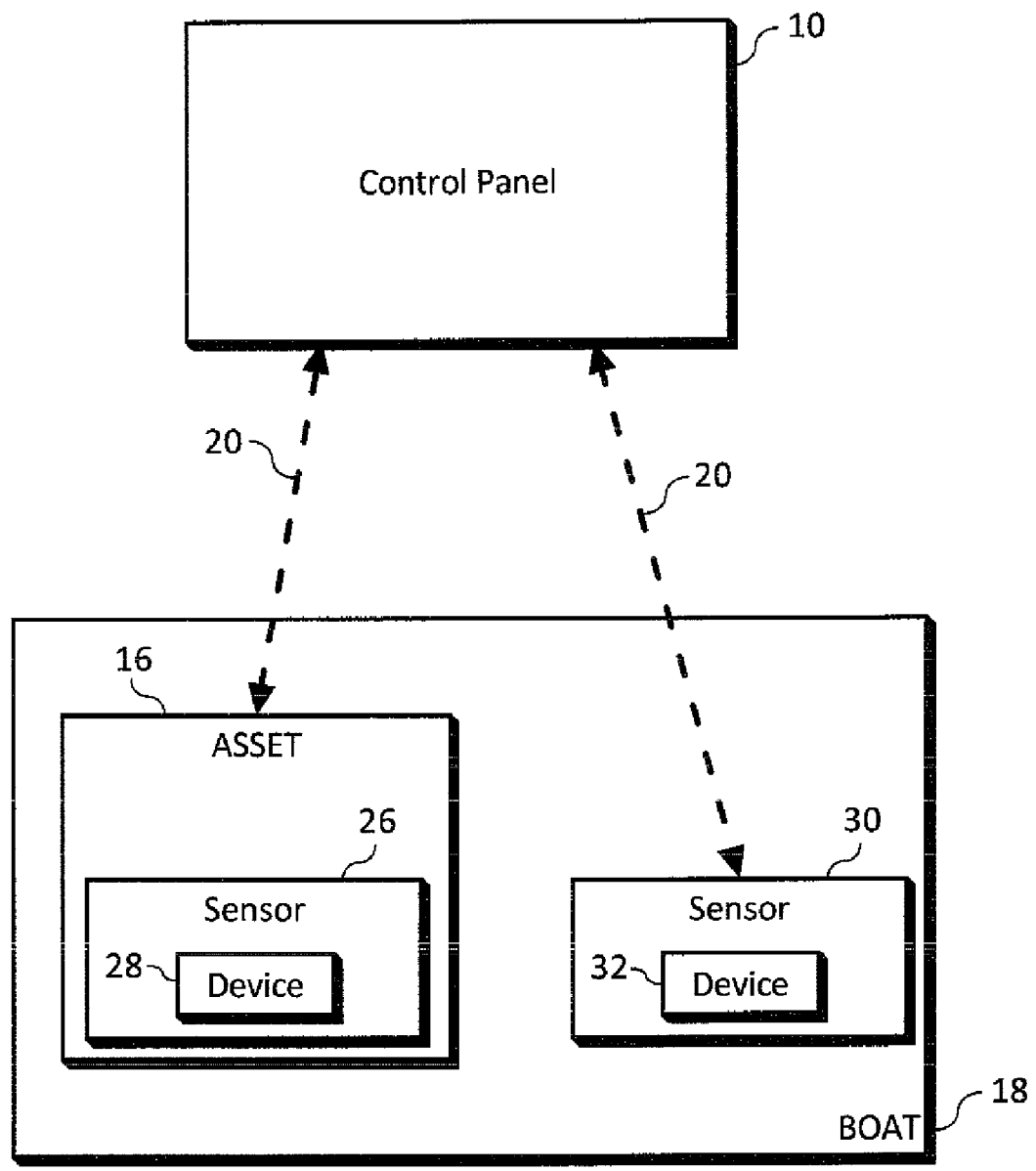
FIG. 3 is a schematic illustration of a second embodiment of the present invention.

A second, High Security, embodiment, is shown in FIG. 3. This High Security Embodiment has better catch and reject performance characteristics than the first embodiment. The High Security Embodiment requires that the sensor be implemented with a wireless technology that is legally permitted to transmit telemetry data continuously. In the United States (for example), the Federal Communication Commission (FCC) restricts this style of transmission to specific frequency bands and radio technologies. This implies other system-wide design decisions. For this reason, the choice as to the best embodiment for a given application will generally be determined by commercial considerations.

This second embodiment includes a security control panel or panel 10 similar to the first embodiment and further comprises a sensor 26 mounted on an asset 16 to be protected. As with the first embodiment, each asset 16 desiring protection has its own sensor 26, and while only one asset 16 and its sensor 26 is shown, a panel 10 can provide protection for more than one asset 16. Each asset sensor 26 has an accelerometer device 28, which is typically an internal device. A reference sensor 30 having its own accelerometer device 32 resides at the panel 10. In one embodiment, this reference sensor 30 is mounted at a known-stable location 18; in the alternative, the device 32 can reside within the panel 10. One reference sensor 30 can support multiple asset sensors 26. The sensors 26, 30 can communicate with the panel 10 using wireless technology 20.

The high security embodiment design is as follows. The asset sensor 26 functions by measuring the acceleration vector applied to the accelerometer device 28. The acceleration vector applied to the asset sensor's accelerometer device 28 normally is simply gravity. Assuming a three dimensional accelerometer is used, a measured acceleration vector for the sensor 26 is:

$$\bar{a}_s = [x_s, y_s, z_s]$$

From simple physics, it is known that the magnitude of the acceleration vector is given by:

$$\bar{a}_s = \sqrt{\sqrt{x_s^2 + y_s^2 + z_s^2}}$$

It is also known that the acceleration due to gravity is fixed by the Earth's gravitational field strength at approximately 9.8 ms$^{-2}$; the sensor 26 is calibrated accordingly. Hence, when the sensor 26 is at rest or moving at constant velocity, $$\bar{a}_s \approx 9.8 \text{ ms}^{-2}$$

The accelerometer 32 that is at the known location 18 is used to measure "local gravity", which is the net sum of gravity plus any acceleration being applied to the entire building. This can be called "local gravity" and represented as:

$$\bar{g} = [x_g, y_g, z_g]$$

Movement by the protected asset 16 is interpreted by its sensor 26 as net acceleration, or gravity plus "theft acceleration". A possible alarm is detected when motion occurs in accordance with sensing criteria, such as short motion, long motion, and tilt with respect to gravity as described above. When the asset sensor 26 detects a possible alarm using the existing sense criteria, rather than simply declaring an alarm or transmitting an alarm signal, the sensor 26 begins transmitting raw acceleration data to the panel 10. The panel 10 continuously calculates the magnitudes of the two acceleration vectors:

$$\bar{a}_s = \sqrt{x_s^2 + y_s^2 + z_s^2} \text{ (using received sensor data), and}$$

$$\bar{g} = \sqrt{x_g^2 + y_g^2 + z_g^2} \text{ (using locally sensed data at the panel end).}$$

Therefore, for each sample acquired, the net difference in acceleration between the asset and the reference point can be calculated as:

$$\delta\bar{a} = |\bar{a}_s - \bar{g}| \quad (\text{EQ. 1})$$

If the net difference in acceleration exceeds a predefined threshold, such as an experimentally determined threshold, it is concluded that the asset 16 is being moved relative to the fixed reference point 18. Therefore, this is a real alarm and an alarm notification is transmitted. This technique automatically self-compensates for the fact that the sensor 26 attached to an asset 16 will not necessarily be mounted in the same orientation as the reference sensor 30.

Housing the accelerometer device 32 in the panel advantageously enables remote updating. Further, maintaining the predetermined threshold in the panel 10 allows remote updating of this threshold, enabling its sensitivity to be improved.

Figure 4:
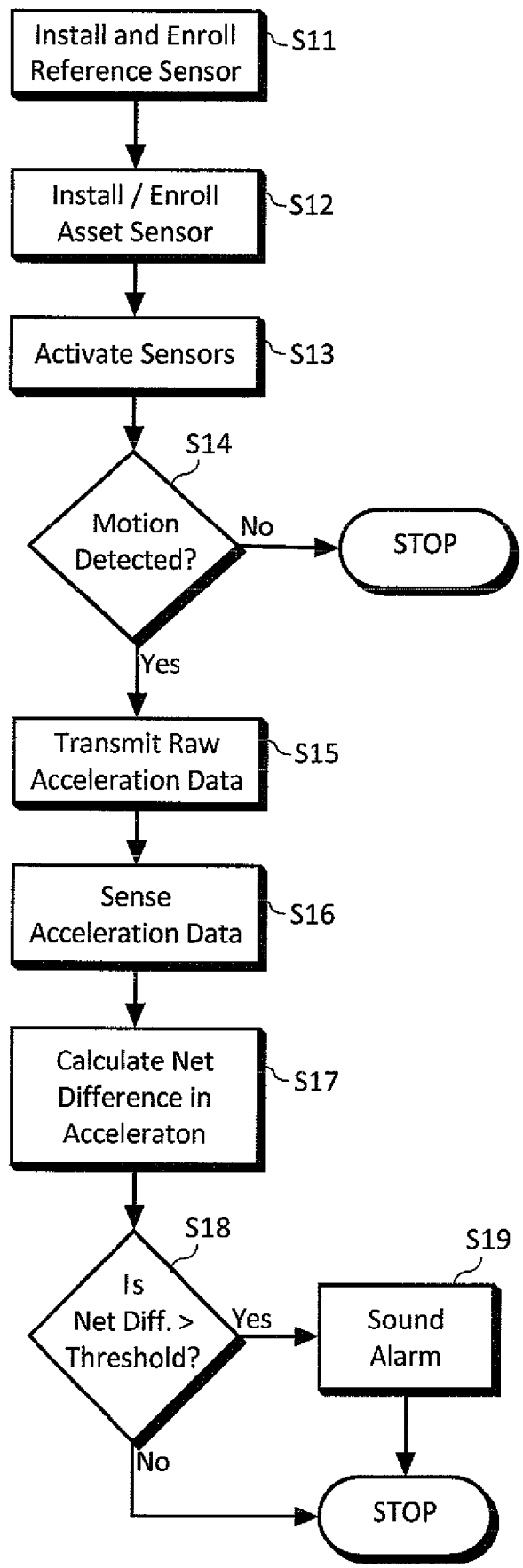
FIG. 4 is a flow diagram of the embodiment of FIG. 3.

Operation of the second embodiment is shown as a flow diagram in FIG. 4. In step S11, the reference sensor 30 and acceleration device 32 are installed, and enrolled or associated with the control panel 10. In step S12, the asset sensor 26 is installed or mounted on an asset 16 and enrolled with the panel 10. In step S13, the sensors 26, 30 are activated.

In step S14, when motion is detected by the asset sensor 26 (S14=Y), the accelerometer device 28 transmits raw acceleration data to the panel 10 in step S15. If no motion is detected (S14=N), processing can stop.

In step S16, which can occur simultaneously with step S15, local acceleration data is sensed by the panel 10 from the reference sensor's accelerometer device 32. The net difference in acceleration is calculated in step S17. This calculation can be performed using equation (EQ. 1) above.

If the net difference in acceleration is greater than a predetermined threshold (S18=Y), then an alarm is signaled or sounded in step S19. Otherwise (S18=N), no alarm is signaled.

Other embodiments are also possible. For example, if the asset sensor was a bidirectional radio device, the panel could broadcast gravity reference information during a potential alarm, in order to distinguish false alarms, and the disambiguation could occur in the sensor rather than at the panel.

Various aspects of the present disclosure may be embodied as a program, software, or computer instructions embodied in a computer or machine usable or readable medium, which causes the computer or machine to perform the steps of the method when executed on the computer, processor, and/or machine.

The wireless communication capabilities 20 can be performed on a computer network. The security system can include a computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for false alarm prevention in unstable locations, comprising steps of:
    activating an asset sensor for sensing an asset and a reference sensor for sensing a known location;
    detecting motion of the asset in the asset sensor;
    determining if the reference sensor detects motion of the known location; and
    preventing transmission of an alarm if the reference sensor detects the motion of the known location.

2. The method according to claim 1, further comprising the steps of:
    enrolling the asset sensor in one or more asset zones in a control panel; and
    enrolling the reference sensor in one or more reference motion zones in the control panel, wherein at least one zone of the one or more asset zones corresponds to one zone of the one or more reference motion zones.

3. The method according to claim 2, wherein the step of detecting motion in the asset sensor comprises recognizing a fault in one asset zone of the one or more asset zones, and the step of determining if the reference sensor detects motion comprises detecting motion in one reference motion zone corresponding to the one asset zone.

4. The method according to claim 1, wherein the step of detecting motion further comprises activating a timer to compensate for timing differences between the asset sensor and the reference sensor.

5. The method according to claim 1, wherein the reference sensor is mounted on a known-stable location and the asset sensor is mounted on an asset.

6. A system for false alarm prevention in unstable locations, comprising:
    an asset sensor for sensing an asset;
    a reference sensor for sensing a known location; and
    an alarm, wherein motion of the asset is detected in the asset sensor and if the reference sensor detects motion of the known location, then the alarm is prevented from being transmitted.

7. The system according to claim 6 further comprising:
    one or more asset zones in a control panel, said asset sensor being enrolled in said asset zones; and
    one or more reference motion zones in the control panel, said reference sensor being enrolled in said reference motion zones, wherein at least one zone of the one or more asset zones corresponds to one zone of the one or more reference motion zones.

8. The system according to claim 7, wherein motion is detected in the asset sensor comprises recognizing a fault in one asset zone of the one or more asset zones, and the reference sensor detects motion if motion is detected in one reference motion zone corresponding to the one asset zone.

9. The system according to claim 6 further comprising a timer activated to compensate for timing differences between the asset sensor and the reference sensor.

10. The system according to claim 6, wherein the reference sensor is mounted on a known-stable location and the asset sensor is mounted on an asset.

11. A method for false alarm prevention in unstable locations, comprising steps of:
   activating an asset sensor for sensing an asset and a reference sensor for sensing a known location;
   detecting motion of the asset in the asset sensor and transmitting acceleration data of the asset in accordance with the detected motion of the asset;
   sensing local acceleration data of the known location from the reference sensor; and
   signaling an alarm if a difference between the transmitted acceleration data of the asset and the local acceleration data of the known location is greater than a predetermined threshold.

12. The method according to claim 11, wherein the reference sensor is mounted on a known-stable location and the asset sensor is mounted on an asset.

13. The method according to claim 11, wherein the step of sensing is performed by a control panel and the reference sensor is mounted in the control panel.

14. The method according to claim 11, further comprising the steps of:
   enrolling the asset sensor in a control panel; and
   enrolling the reference sensor in the control panel, wherein the step of sensing is performed by the control panel.

15. A system for false alarm prevention in unstable locations, comprising:
   an asset sensor for sensing an asset;
   a reference sensor for sensing a known location; and
   an alarm, wherein motion of the asset is detected in the asset sensor and acceleration data of the asset is transmitted in accordance with the detected motion of the asset, and the alarm is signaled if a difference between the transmitted acceleration data of the asset and local acceleration data of the known location is greater than a predetermined threshold.

16. The system according to claim 15, wherein the reference sensor is mounted on a known-stable location and the asset sensor is mounted on an asset.

17. The system according to claim 15, further comprising a control panel and the reference sensor is mounted in the control panel.

18. The system according to claim 17, wherein the asset sensor is enrolled in the control panel, and the difference between the transmitted acceleration data and the local acceleration data is calculated by control panel.

* * * * *